UNITED STATES PATENT OFFICE.

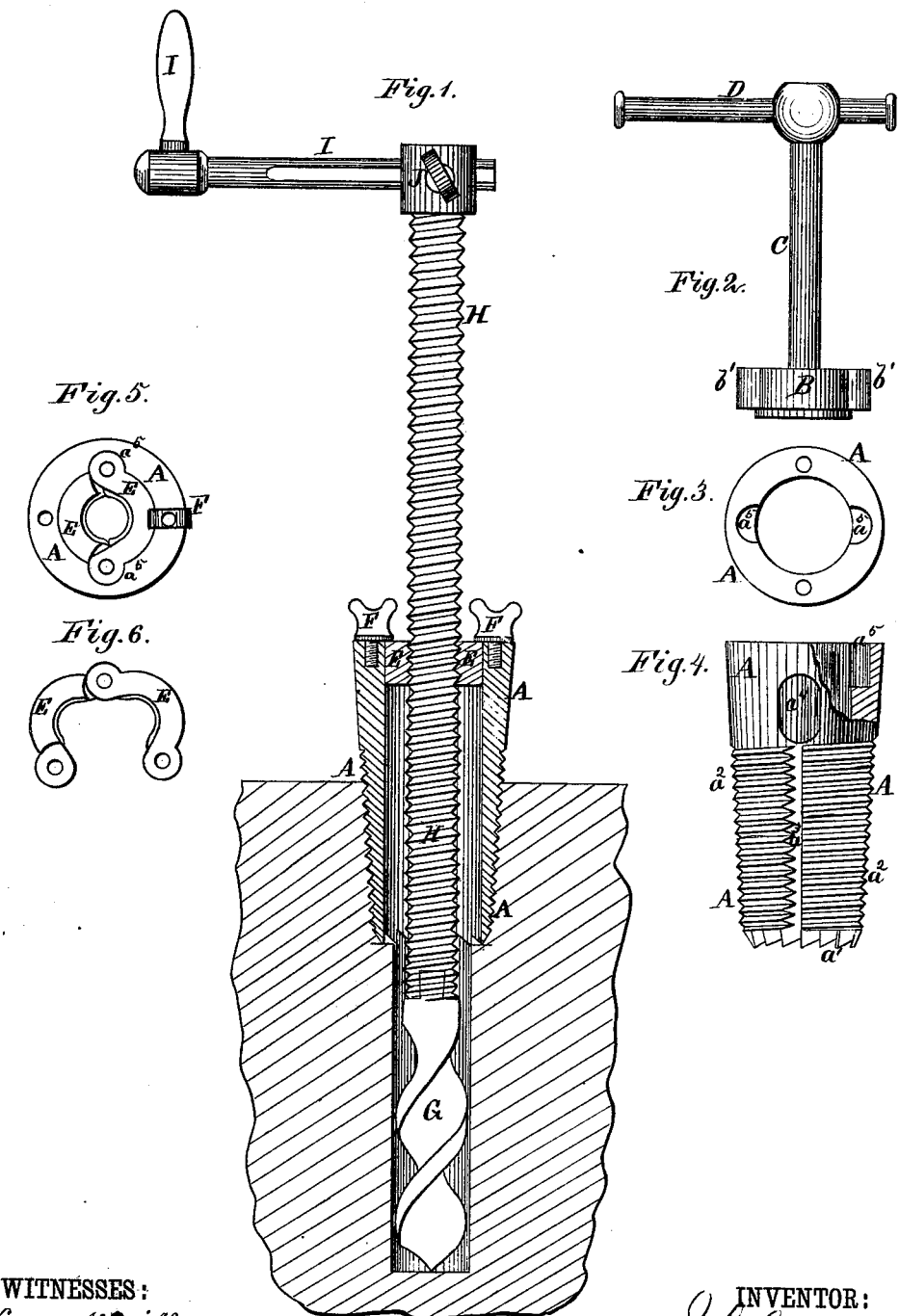

JAMES J. RIGNEY AND WILLIAM HEMINGRAY, OF SHAMOKIN, PA.

IMPROVEMENT IN COAL-DRILLS.

Specification forming part of Letters Patent No. 200,936, dated March 5, 1878; application filed January 28, 1878.

*To all whom it may concern:*

Be it known that we, JAMES JOSEPH RIGNEY and WILLIAM HEMINGRAY, of Shamokin, in the county of Northumberland and State of Pennsylvania, have invented a new and useful Improvement in Coal-Drills, of which the following is a specification:

Figure 1 is a side view of our improved machine, partly in section to show the construction. Fig. 2 is a side view of the wrench for screwing the cylinder in and out. Fig. 3 is a detail view of the outer end of the cylinder. Fig. 4 is a side view of the cylinder, part being broken away to show the construction. Fig. 5 is a view of the end of the cylinder with the hinged nut in place. Fig. 6 is a detail view of the hinged nut opened.

Similar letters of reference indicate corresponding parts.

The object of this invention is to furnish an improved machine for drilling or boring coal, which shall be simple in construction, convenient in use, and effective in operation, enabling the holes to be bored much easier and much quicker than when the ordinary implements are used.

The invention consists in the tapering cylinder, made with the teeth, the screw-thread, the longitudinal grooves or channels, and the recesses, to adapt it to support and guide the drill; in the combination of the hinged nut and the cross-head screws with the tapering cylinder and the screw that carries the drill; in the combination of the drill and the adjustable crank with the screw, the hinged nut, and the tapering cylinder, as hereinafter fully described.

A is a tapering cylinder, upon the edge of the smaller end of which are formed teeth $a^1$ and upon its outer surface is formed a screw-thread, $a^2$, extending from its smaller end for about two-thirds its length. Upon the outer surface of the cylinder A, across its screw-threads, are cut longitudinal grooves or channels, $a^3$, to allow the coal-dust to work its way out.

In the sides of the outer part of the cylinder A are formed holes $a^4$, to allow the drill-chips to escape. In the inner surface of the opposite sides of the outer end of the cylinder A are formed recesses $a^5$, to receive lugs $b'$ formed upon the edge of the head B of the wrench. To the head B is attached a shank or stem, C, having a sliding lever or pin, D, attached to its outer end.

E is a nut, made in two semi-tubular parts, with lugs upon their ends to receive the pins by which they are secured to each other. One of the pins may be permanent, to serve as a hinge, and the other detachable, to enable the nut to be applied to and detached from the screw, as may be required.

The lugs of the hinged nut E are so formed as to fit into the recesses $a^5$ in the cylinder A, to keep the said nut from turning in said cylinder. The nut E is locked in the end of the cylinder A by cross-head screws F screwed into the edge of the cylinder A.

G is the bit or drill, which has a dovetailed tenon formed upon its end, to fit into a dovetailed notch in the end of the screw H. The thread of the screw H fits into the thread of the nut E, and in the outer end of the said screw is formed a hole to receive the arm of the crank I, which is secured in place by a set-screw, J, passing in through the end of the said screw and resting against the flattened side of the said crank-arm, so that the said crank may be lengthened and shortened as circumstances may require.

In using the machine, a hole five or six inches deep is formed in the coal with a pick or ordinary drill, and the cylinder A is screwed into it by means of the wrench B C D. The bit G is attached to the screw H, and the bit and screw are inserted in the cylinder A. The nut E is applied to the screw H, is slipped into its seat in the cylinder A, and secured in place by the screws F. Then, by turning the screw H by means of the crank I, the bit or drill G will be forced into the coal, the rapidity of feed depending upon the pitch of the thread of the screw H.

Having thus described our invention, we claim as new and desire to secure by Letters Patent—

1. The tapering cylinder A, made with the teeth $a^1$, the screw-thread $a^2$, the longitudinal grooves or channels $a^3$, holes $a^4$, and the recesses $a^5$, to adapt it to support and guide the drill, substantially as herein shown and described.

2. The combination of the hinged nut E and the cross-head screws F with the tapering cylinder A and the screw H, that carries the drill G, substantially as herein shown and described.

3. The combination of the drill G and the adjustable crank I with the screw H, the hinged nut E, and the tapering cylinder A, substantially as herein shown and described.

JAMES JOSEPH RIGNEY.
WILLIAM HEMINGRAY.

Witnesses:
A. CALDWELL,
JAMES A. SHIPP.